United States Patent [19]

Iglehart et al.

[11] Patent Number: 5,815,562
[45] Date of Patent: Sep. 29, 1998

[54] APPARATUS AND METHOD FOR PROVIDING A USER WITH ONE TELEPHONE NUMBER THAT RINGS PHONES ON HETEROGENEOUS SYSTEMS WORLDWIDE

[75] Inventors: David Iglehart; Leland Lester, both of Austin; Roger Bjork, Round Rock; Vedat Bilgutay, Austin, all of Tex.; Andrzej Koscinski, Mountain View, Calif.; Lee Rosenbaum, Boca Raton, Fla.

[73] Assignee: Siemens Business Communication Systems, Inc., Santa Clara, Calif.

[21] Appl. No.: 747,466

[22] Filed: Nov. 12, 1996

[51] Int. Cl.⁶ .............................. H04M 3/46; H04M 3/56; H04M 1/00; H04M 7/00
[52] U.S. Cl. ........................ 379/211; 370/264; 379/157; 379/158; 379/179; 379/202; 379/212; 379/219; 379/230
[58] Field of Search ..................... 379/156, 157, 379/158, 167, 171, 172, 177, 179, 184, 201, 202, 204, 205, 206, 207, 210, 211, 212, 219, 220, 230, 161; 370/259, 260, 264

[56] References Cited

U.S. PATENT DOCUMENTS 5,206,901  4/1993  Harlow et al. ...................... 379/205 X
5,454,032  9/1995  Pinard et al. ....................... 379/211 X
5,475,748  12/1995  Jones ................................... 379/210 X
5,502,762  3/1996  Andrews et al. ................... 379/204 X

OTHER PUBLICATIONS

*Hicom 300: Digital Alarm and Conference Server for Hicom,* Siemens AG, 1995, 4 pages.

*Primary Examiner*—Harry S. Hong

[57] ABSTRACT

A server allows a worldwide telephone number associated with a local telephone to be shared by one or more remote telephones. A call placed to the worldwide telephone number rings at the local telephone and at least one of the remote telephones. The server stores a set of telephone numbers to be associated with a worldwide telephone number serviced by the switch to which the local telephone is connected. The server receives notification of a telephone call from a calling telephone to the worldwide telephone number The server retrieves the set of telephone numbers associated with that worldwide telephone number, and places calls to telephone numbers in the set through the switch. The server then causes a connection to be made between the local telephone or the remote telephone, depending on which telephone goes off hook first, to the calling telephone. In one embodiment of the present invention, the server causes the connection to be made by causing the switch to make a conference call connection between the calling telephone and the remote telephone.

8 Claims, 4 Drawing Sheets

FIG_3

APPARATUS AND METHOD FOR PROVIDING A USER WITH ONE TELEPHONE NUMBER THAT RINGS PHONES ON HETEROGENEOUS SYSTEMS WORLDWIDE

FIELD OF THE INVENTION

The present invention relates to telecommunication systems, and more particularly, to a system that allows a single telephone number to service a user no matter where the user is currently located.

BACKGROUND OF THE INVENTION

As the population becomes more mobile, contacting a person by telephone becomes increasingly difficult. Consider the case of a salesperson who works out of several different offices, including offices outside of the United States. There are several currently used methods for a client to contact the salesman. For example, the client can leave the salesperson a message at a central number for the salesperson's company. This method has the disadvantage of relying on the salesperson to call in and pick up messages. The approach leads to long delays in returning calls, and hence is less than ideal.

Another method for dealing with this problem involves the use of paging systems. The salesman provides his clients with a pager number. The clients can then leave a telephone number and/or short message. This solution requires the salesperson to be within the operating area of a single paging system and have his or her pager turned on. For salespersons who travel outside of the U.S., this is not always possible. Furthermore, it requires the client to be competent in using the paging system, and also requires the client to keep track of yet another telephone number associated with the salesperson. Finally, many paging systems do not provide any assurance that the salesperson actually received the page.

Another method for dealing with this problem utilizes call forwarding. Many telephone systems allow the user of a telephone to program it to forward the call to another number when it is not answered within some predetermined number of rings. In principle, the salesperson can program his or her various phones so that they keep forwarding the call until the telephone at which the salesperson is located finally rings. If a large number of phones are involved, this approach becomes too complicated. Furthermore, it requires the calling party to stay on the line for a significant period of time if multiple call forwarding is required. In addition, it requires the salesperson to program his or her phones each time he or she leaves on a trip. Finally, it requires the salesperson to have call forwarding capabilities on all of the possible telephones at which he or she may be reached.

Broadly, it is the object of the present invention to provide an improved apparatus and method for allowing two or more telephones to share the same telephone number.

These and other objects of the present invention will become apparent to those skilled in the art from the following detailed description of the invention and the accompanying drawings.

SUMMARY OF THE INVENTION

The present invention allows a worldwide telephone number associated with a local telephone to be shared by one or more remote telephones. A call placed to the worldwide telephone number rings at the local telephone and at least one of the remote telephones. A server stores one or more telephone numbers to be associated with a worldwide telephone number serviced by the switch to which the local telephone is connected. The server receives notification of a telephone call from a calling telephone to the worldwide telephone number. The server retrieves telephone numbers corresponding to one or more telephones associated with that worldwide telephone number and calls them. When one of the telephones associated with the worldwide telephone number goes off hook, the server then causes a connection to be made between the remote in-calling telephone and whichever telephone goes off hook first. In one embodiment of the present invention, the server causes the connection to be made by causing the switch to conference the remote in-calling telephone and the user's remote telephone, with the server itself remaining as a silent party to the conference. In other alternatives, the server conferences together the remote in-calling telephone and a local telephone of the user's. In some alternatives, after conferencing together the in-calling party and the user, the server drops out of the conference.

DETAILED DESCRIPTION OF THE INVENTION

Figure 1:
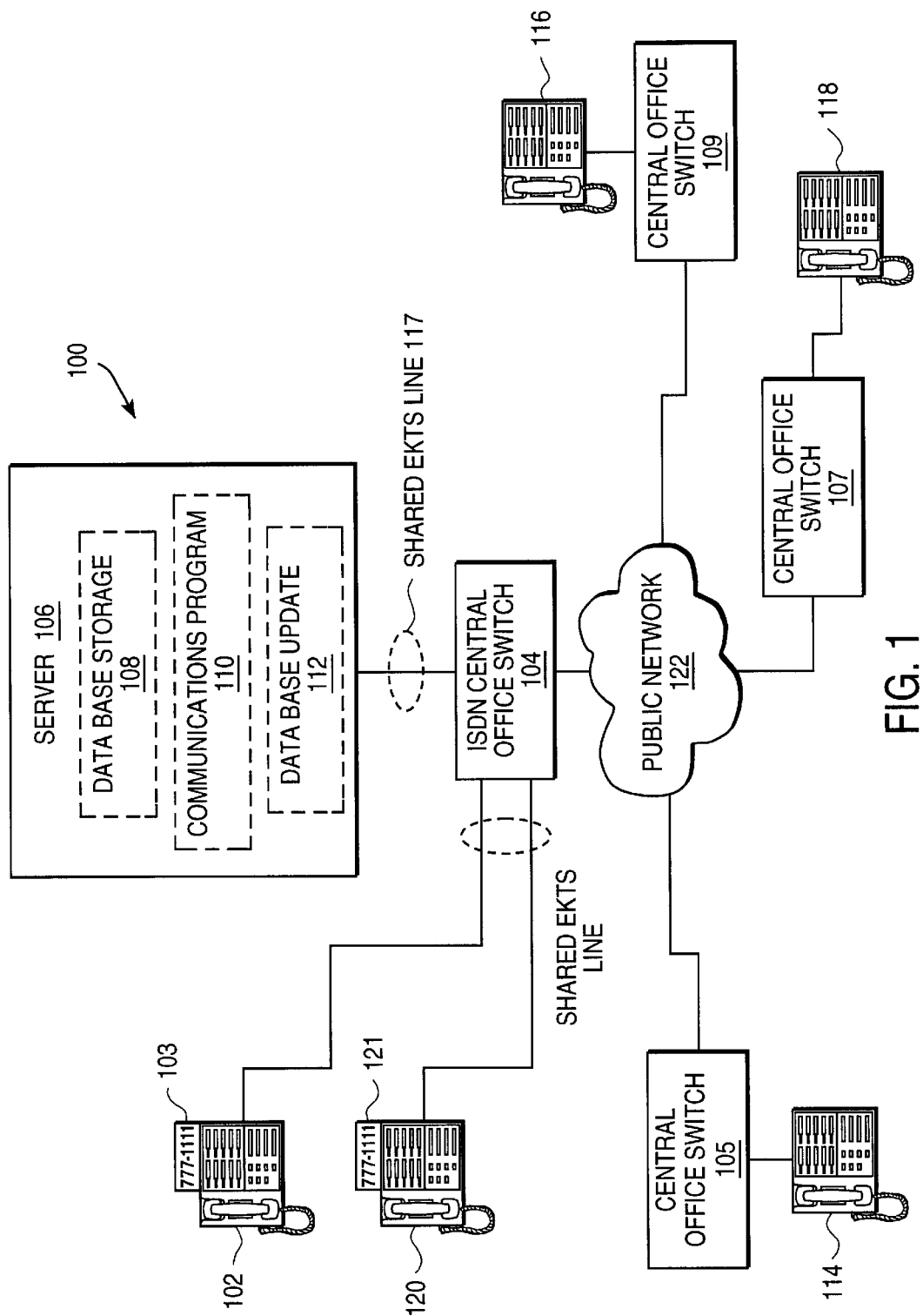
FIG. 1 is a block diagram illustrating the method and apparatus used to practice an ISDN, EKTS-supported embodiment in accordance with the present invention.

A system 100 in accordance with an embodiment of the invention is shown in FIG. 1. In system 100, the telephones are participants in electronic key telephone system (EKTS) support on an integrated services digital network (ISDN) central office switch. The telephone number of a user's local ISDN telephone 102 is designated as a worldwide telephone number. This number is shared with a server 106. When the worldwide telephone number is called, the call comes into an ISDN central office switch 104. Central office switch 104 presents the call to local telephone 102 and server 106, which runs software including data base storage 108, a communications program 110, and a data base update program 112.

Data base 108 includes a table that associates n telephone numbers with the worldwide telephone number. Communications program 110 looks up the n associated telephone numbers and places telephone calls that ring at each associated telephone. The calls are placed sequentially, as the server executes instructions; however, the speed of executing instructions is typically within fractions of seconds, so that the calls are placed practically simultaneously.

For example, a call is made from a remote in-calling phone 114 to user's local phone 102, as depicted in FIG. 1. A telephone 120 is in the same EKTS group as phone 102. The call information is passed on to server 106 and telephones 102 and 120, using standard EKTS messages. The BellCore National ISDN Standards (NI-1 and NI-2) allow for terminals to share directory numbers if they are configured in an electronic key telephone system (EKTS) group. A data base 108 is consulted, and it is discovered that two remote telephones are associated with the worldwide number, a telephone 116 and a telephone 118. Server 106 then generates outgoing calls (in split-second sequence) across public network 122 to user's remote telephones 116 and 118. Server 106 connects to ISDN central office switch 104 with one line, a shared EKTS line 117.

The call from remote phone 114 rings through to both phones 102 and 120, as supported by EKTS. The EKTS-supported telephones 102 and 120 also display an indication on their respective liquid crystal displays (LCDs) 103 and 121 that a call has come in to the group phones.

When one of the telephones is answered (goes off hook), a CONNECT signal is sent back to server 106. Several alternatives can occur in response to the CONNECT signal, examples of which will now be examined in turn.

In a first example, either of EKTS-supported telephones 102 and 120 is answered and goes off hook. For example, assume telephone 102 goes off hook. A CONNECT signal is sent back to switch 104. Switch 104 then connects remote caller at telephone 114 with telephone 102 and signals to server 106 and telephone 120 that the call has been answered. Server 106 clears calls to remote phones 116 and 118. The presence of this call is indicated (for example, by display on an LCD or LED) of display 121 on EKTS-supported telephone 120. In this way, another party in the group who sees the call in progress can bridge into the call.

In another example, user's remote phone 116 goes off hook to answer the call. Using the conference feature of switch 104, communications program 110 in server 106 conferences together the remote user's phone 116 and remote in-calling phone 114. As a standard EKTS function, ISDN central office switch 104 stops ringing the user's local phone 102. Server 106 can either stay in the conference as an EKTS-supported party or can drop out. If server 106 stays in, the call continues to be displayed on displays of telephones 102 and 120, and observers can bridge in. The call between remote in-calling phone 114 and remote user's phone 116 is seen as an EKTS-associated call on the user's local phone 102. If server 106 drops out, the call is no longer EKTS-supported and the call is not displayed on displays 103 and 121 of telephones 102 and 120. Accordingly, observers cannot bridge in. In either case, the call appears as a normal call to the parties at telephones 114 and 116.

Figure 2:
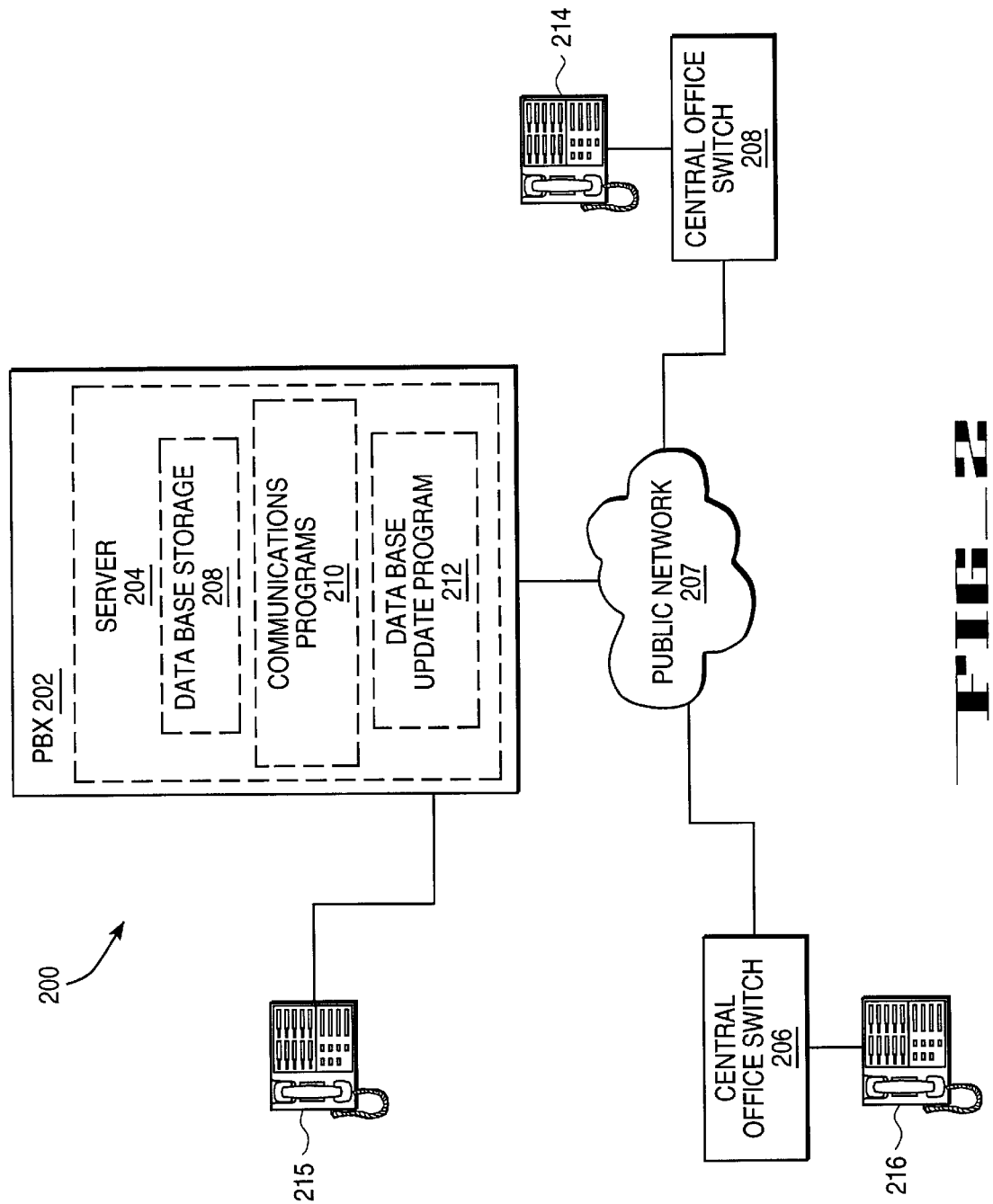
FIG. 2 is a block diagram of an embodiment in accordance with the present invention, in which the local switching system is a PBX.

A PBX-based system 200 of an alternative embodiment in accordance with the present invention is shown in FIG. 2. In the system of FIG. 2, a server 204 is included within a PBX 202. The software includes data base storage 208 and a communications program 210 for servicing calls to worldwide telephone numbers. When PBX 202 receives a call from a remote telephone 216 to a telephone number, it looks up the physical location of the corresponding telephone on the PBX. Software in the server also determines whether the telephone number being called is a worldwide telephone number. If it is a worldwide telephone number, the PBX communications program 210 looks up the other telephone numbers associated with the number being called, and communications program 210 places calls to all of the telephone numbers associated with the worldwide telephone number. As soon as one of the telephone numbers goes off hook, the PBX conferences together the answering phone and the remote in-calling phone.

For example, assume that the call is answered by a user's remote telephone 214. PBX 202 conferences together remote in-calling telephone 216 and user's remote telephone 214. When a CONNECT message is received by PBX 202, PBX 202 stops ringing at a user's local telephone 215, but keeps a visual representation of the call at the user's local phone 215. The call between remote in-calling telephone 216 and user's remote telephone 214 is conferenced together and appears as a normal call to both parties.

Figure 3:
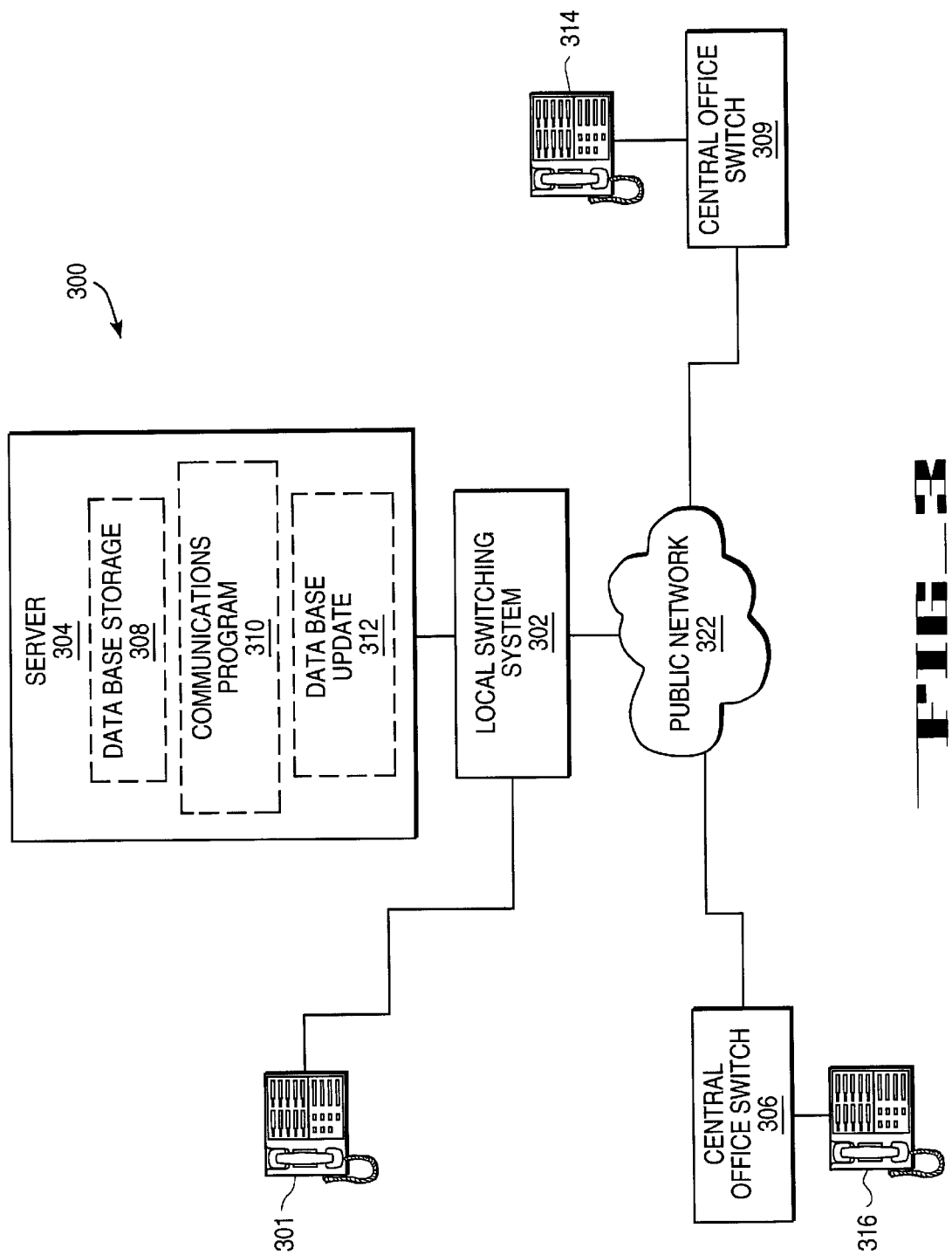
FIG. 3 is a block diagram of an embodiment in accordance with the present invention for use with a general telephone system.

A system 300 of an alternative non-EKTS-supported general embodiment is shown in FIG. 3. In system 300, the telephone number of a user's local (primary) phone 301 is a worldwide telephone number. When the worldwide telephone number is called, the call comes into a local switching system 302. Local switching system 302 places a call to a server 304, which runs software including data base storage 308, a communications program 310, and a data base update program 312.

Data base storage 308 includes a table that associates n telephone numbers with the worldwide telephone number. Communications program 310 looks up the n associated numbers and causes calls to be placed to each associated number. For example, when local switching system 302 receives a call for a local telephone number, it presents it to server 304 so that server 304 can determine whether calls to that number are to be shared. In this example, assume that data base 308 determines that calls to the worldwide number are to be shared between user's local phone 301 and user's remote phone 314. The call from a remote in-calling phone 316 rings through at both phones 301 and 314. If, for example, user's remote phone 314 goes off hook to answer the call, the server conferences together user's remote phone 314 and remote in-calling phone 316, and stops ringing the user's local phone 301. The call between remote in-calling phone 316 and user's remote phone 314 appears as a normal phone call to both parties.

Figure 4:
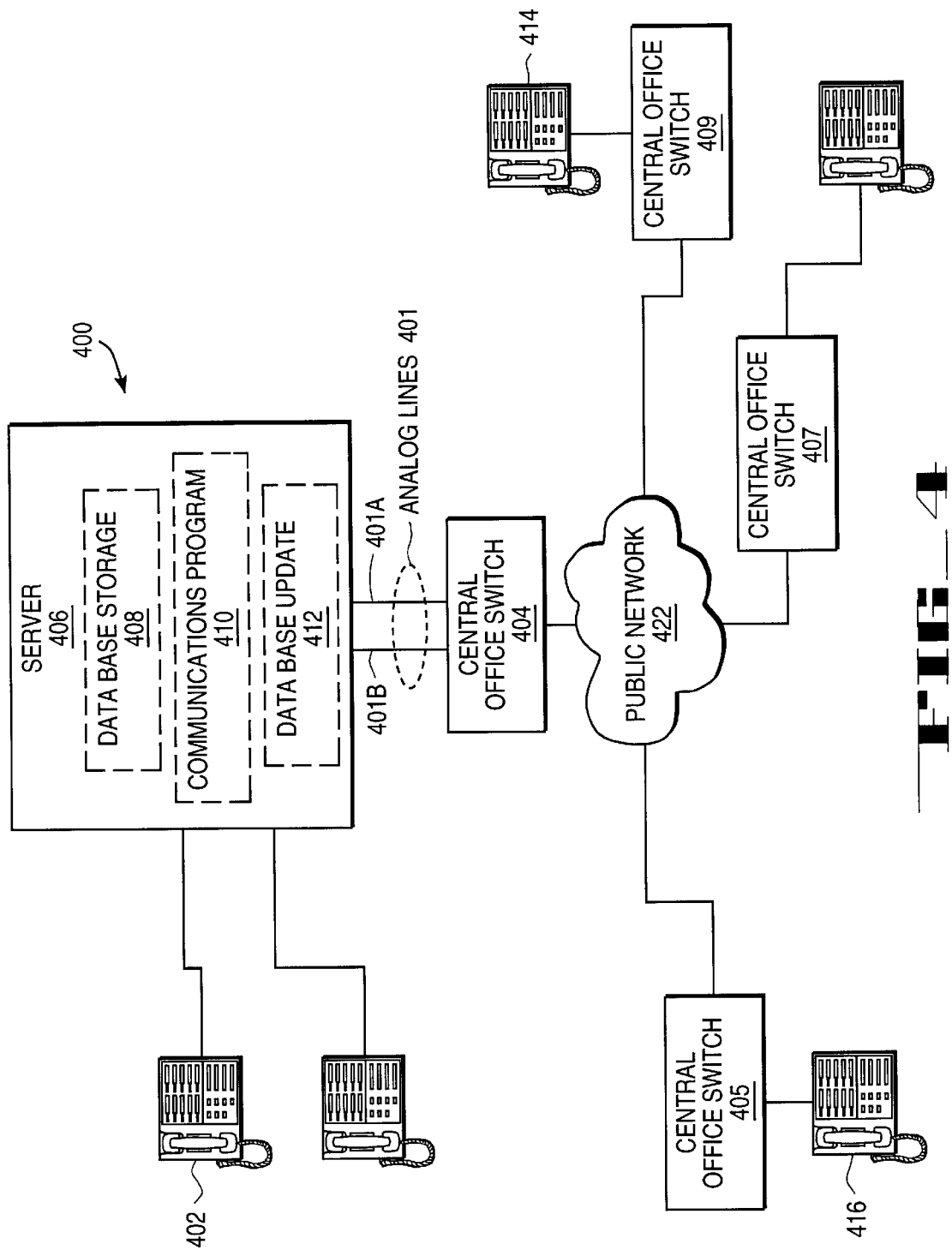
FIG. 4 is a block diagram of an embodiment in accordance with the present invention for use with an analog-based telephone system.

An alternative embodiment in an analog-based system 400 in accordance with the present invention is shown in FIG. 4. In the analog system, two analog lines 401 come from a local central office switch 404, and are connected to a server 406. A first analog line 401A is used by a user's primary telephone 402. A server data base 408 is set up with telephone numbers to both a primary telephone 402 and a secondary (remote) telephone 414. A call is made from a remote in-calling telephone 416 to user's primary phone 402. The call goes through central office switch 404, and the information is received by server 406. Data base 408 in server 406 determines that the calls to the primary phone 402 are to be shared with user's remote telephone 414. A communications program 410 uses a second analog line 401B to place a call to user's remote telephone 414, across central office switch 404, a public network 422, and a remote central office switch 409. Both primary telephone 402 and secondary (remote) telephone 414 ring.

Assume remote telephone 414 goes off hook to answer the call. In that case, server 406 bridges together the call from server 406 to the user's remote phone 414. User's primary local telephone 402 stops ringing. The call between remote in-calling phone 416 and user's remote phone 414 is conferenced together in server 406 and appears as a normal call to both partcipants. In contrast to the EKTS-supported embodiment of system 100, the call is not displayed on other telephones, even other telephones associated with the same local switch 404 as local telephone 402, such as a telephone 403. Accordingly, the call cannot be observed and observers cannot bridge in.

Various modifications to the present invention will become apparent to those skilled in the art from the foregoing description and accompanying drawings. The system can be used with a personal computer including an ISDN card. The computer can include a server that performs functions of the server to implement worldwide calls. Accordingly, the present invention is to be limited solely by the scope of the following claims.

What is claimed is:

1. A server for causing a worldwide telephone number associated with a local telephone connected to an integrated services digital network (ISDN) switch to be shared by one or more remote telephones, said local telephone and at least one of said remote telephones participating in electronic key telephone systems (EKTS) support, such that a call placed to said worldwide telephone number rings at said local telephone and at least one of said remote telephones, said server comprising:

data base means for storing a set of telephone numbers to be associated with a worldwide telephone number serviced by said switch;

means for receiving a notification of a telephone call from a calling telephone to said worldwide telephone number, said receiving means including means for receiving a signal specifying said worldwide telephone number;

means for retrieving said set of telephone numbers;

means for placing a call to each number in said set of numbers; and connecting means for connecting by conference call connection either said local telephone or one of said remote telephones to said calling telephone depending on which of said local telephone and said remote telephones goes off hook first.

2. The server of claim 1 wherein said connecting means comprises a bridge that allows a second telephone to conference into said call.

3. A server as in claim 1 in which said local telephone and said at least one of said remote telephones further include:

display means for displaying the presence of the connected call on displays of said telephones participating in said EKTS support.

4. A server as in claim 1 wherein said remote telephones further include at least one telephone not participating in said EKTS support, said at least one telephone not participating in said EKTS support being connected to said call via a conference call connection.

5. A server for causing a worldwide telephone number associated with a local telephone connected to an integrated services digital network (ISDN) switch to be shared by one or more remote telephones, said local telephone and at least one of said remote telephones participating in electronic key telephone systems (EKTS) support, such that a call placed to said worldwide telephone number rings at said local telephone and at least one of said remote telephones, said server comprising:

data base means for storing a set of telephone numbers to be associated with a worldwide telephone number serviced by said switch;

means for receiving a notification of a telephone call from a calling telephone to said worldwide telephone number, said receiving means including means for receiving a signal specifying said worldwide telephone number;

means for retrieving said set of telephone numbers;

means for placing a call to each number in said set of numbers; and connecting means for connecting either said local telephone or one of said remote telephones to said calling telephone depending on which of said local telephone and said remote telephones goes off hook first, wherein said server is a party to said connection.

6. A method for causing a worldwide telephone number associated with a local telephone connected to an integrated services digital network (ISDN) switch to be shared by one or more remote telephones, said local telephone and at least one of said remote telephones participating in electronic key telephone systems (EKTS) support, such that a call placed to said worldwide telephone number rings at said local telephone and at least one of said remote telephones, said method comprising the steps of:

storing a set of telephone numbers to be associated with a worldwide telephone number serviced by said switch;

receiving a telephone call from a calling telephone to said worldwide telephone number, including receiving a signal specifying said worldwide telephone number;

retrieving said set of telephone numbers;

placing a call to each number in said set of numbers; and connecting by conference call connection said local telephone or said remote telephone to said calling telephone depending on which telephone goes off hook first.

7. A method as in claim 6 further including the step of:

displaying the presence of the connected call on said telephones participating in said EKTS support.

8. A server for causing a worldwide telephone number associated with a local telephone connected to an integrated services digital network (ISDN) switch to be shared by one or more remote telephones, said local telephone and at least one of said remote telephones participating in electronic key telephone systems (EKTS) support, such that a call placed to said worldwide telephone number rings at said local telephone and at least one of said remote telephones, said server comprising:

means for receiving a notification of a telephone call from a calling telephone to said worldwide telephone number, said receiving means including means for receiving a signal specifying said worldwide telephone number; and connecting means for connecting by conference call connection at least one of said local telephone or said remote telephones to said calling telephone depending on which of said local telephone and said remote telephones goes off hook first.

* * * * *